Patented Oct. 23, 1951

2,572,252

UNITED STATES PATENT OFFICE 2,572,252

PAINT COMPOSITIONS

Hendrik de W. Erasmus, Lewiston, and James B. Culbertson, Lockport, N. Y., assignors to Union Carbide and Carbon Corporation, a corporation of New York No Drawing. Application March 4, 1949,
Serial No. 79,736

3 Claims. (Cl. 106—148)

This invention relates to improved paint compositions, and particularly to such compositions which dry to form films having superior resistance to abrasion coupled with improved chemical inertness.

In accordance with the invention there is provided a novel pigmented coating composition comprising a vehicle and finely-divided silicon nitride mixed therewith and intimately dispersed therein. When the gray type of silicon nitride is used as a pigment, as prepared by the direct reaction of nitrogen with silicon, an opaque gray paint film is obtained having greater abrasion resistance and chemical inertness than prior paints. Gray silicon nitride can be used with or without other pigments. The white type of silicon nitride, prepared by calcining the product of reacting silicon tetrachloride with ammonia, also gives an abrasion-resistant inert film, but requires that an additional pigment which has better covering power be used therewith since white silicon nitride by itself does not have the superior opacity and covering power of the gray type. Both types of silicon nitride desirably are produced and used as an amorphous powder, the individual particles of which have a length of about one micron or less.

Among the vehicles which can be used successfully with both types of silicon nitride pigment are the following drying oils:

linseed oil
perilla oil
fish oil
soybean oil
tung oil
oiticica oil
dehydrated castor oil Other suitable vehicles for silicon nitride pigment are the following:

nitrocellulose lacquers
cellulose acetate lacquers
phenol formaldehyde resin baking lacquers
urea formaldehyde coating compositions
melamine formaldehyde coating compositions
alkyd resin coating compositions
vinyl coating compositions such as copolymers of vinyl chloride and vinyl acetate
rubber and halogenated rubber paints
polyesters such as ethyl methacrylate
casein type coating compositions
organic and inorganic binders such as ethyl silicate and sodium silicate
varnish Pigmented coating compositions containing silicon nitride as a pigment also can comprise other ingredients which are conventional in the paint art, such as inert reinforcing pigments or pigment extenders, water, vehicles such as turpentine, driers, and various additional pigments suitable for modifying the paint color or increasing its covering power.

Among the pigment extenders which can be used are:

silica
aluminum silicate
magnesium silicate
barium sulfate
calcium sulfate
kaolin
asbestos
barium carbonate
infusorial earth
gypsum
china clay
whiting Among the additional pigments which can be used for modifying color and increasing covering power are the well-known blacks, blues, reds, yellows, greens, browns, and metallics; and among the white pigments which may be used are white lead, zinc oxide, lithopone, titania, blanc fixe, and basic lead sulfate.

Paint compositions containing silicon nitride are particularly valuable for use on surfaces which are subjected to much abrasion. For example, silicon nitride paints stand up longer than prior known paints on exterior porch floors, interior floors, stairs, chair seats, the tops of desks and tables. Also, their superior chemical inertness renders them highly resistant to the heating and actinic action of the sun, and the dissolving action of rain, thus making them especially advantageous for painting exposed surfaces such as metal roofs, gutters, and downspouts.

What is claimed is:

1. A pigmented coating composition comprising a paint vehicle and finely-divided silicon nitride selected from the group consisting of white and gray silicon nitride as a pigment therein.

2. A paint composition comprising a paint vehicle, finely-divided white silicon nitride as a pigment therein, and an additional pigment therein.

3. A paint composition comprising a paint vehicle and finely-divided gray silicon nitride as a pigment therein.

HENDRIK DE W. ERASMUS.
JAMES B. CULBERTSON.

REFERENCES CITED

The following references are of record in the file of this patent:

UNITED STATES PATENTS

| Number | Name | Date |
|---|---|---|
| 993,144 | Bosch et al. | May 23, 1911 |
| 1,102,715 | Bosch et al. | July 7, 1914 |